US006298534B1

(12) United States Patent
Sajota

(10) Patent No.: US 6,298,534 B1
(45) Date of Patent: *Oct. 9, 2001

(54) CHAMBER COMPONENT REMOVAL SYSTEM, APPARATUS AND METHOD

(75) Inventor: Talex Sajota, Campbell, CA (US)

(73) Assignee: Applied Materials, Inc., Santa Clara, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/196,863

(22) Filed: Nov. 20, 1998

Related U.S. Application Data

(60) Provisional application No. 60/066,337, filed on Nov. 21, 1997.

(51) Int. Cl.[7] ..................................................... B23P 19/04

(52) U.S. Cl. .............................. 29/256; 403/16; 29/426.5

(58) Field of Search ............................... 29/525.1, 426.5, 29/525.11, 559, 426.1, 256; 403/338, 380, 11, 16, 110, 373, 374.3

(56) References Cited

U.S. PATENT DOCUMENTS

| | | | | |
|---|---|---|---|---|
| 1,467,400 | * | 9/1923 | Smith et al. . | |
| 1,953,297 | * | 4/1934 | Good | 403/16 |
| 3,847,493 | * | 11/1974 | Peter et al. . | |
| 3,957,381 | * | 5/1976 | Schafer | 403/16 |
| 4,015,324 | * | 4/1977 | Lutter . | |
| 4,372,703 | * | 2/1983 | Szostak | 403/374.3 |
| 4,565,350 | * | 1/1986 | Rozek | 403/16 |
| 4,589,792 | * | 5/1986 | Niziol | 403/11 |
| 4,610,064 | * | 9/1986 | Verstraeten | 29/239 |
| 4,951,601 | * | 8/1990 | Maydan . | |
| 5,075,950 | * | 12/1991 | Steinbock | 29/426.5 |
| 5,604,968 | * | 2/1997 | Fulbright et al. | 29/525.02 |

* cited by examiner

*Primary Examiner*—S. Thomas Hughes
*Assistant Examiner*—Steve Blount
(74) *Attorney, Agent, or Firm*—Thomason, Moser & Patterson, L.L.P.

(57) ABSTRACT

The present invention generally provides an apparatus and a method for separating components of a processing system which are mounted to one another and may adhere after being subjected to processing conditions. In one aspect, the invention provides a removal screw that can be threaded into a removal hole on a first component and an abutment screw that can be threaded into an attachment hole on a second component. To separate the first component from the second component, the abutment screw is first threaded into the attachment hole on the second or stationary component, and then the removal screw is threaded into the removal hole on the first component. An important aspect of this invention is that the removal screw does not contact, and damage, the contact surface between the first and second components to separate the components. As the removal screw engages the abutment screw, the removal screw pushes against the head of the abutment screw without causing surface damage to the second component and forces the two components to separate.

17 Claims, 4 Drawing Sheets

CHAMBER COMPONENT REMOVAL SYSTEM, APPARATUS AND METHOD

This U.S. patent application relates to co-pending U.S. provisional patent application Ser. No. 60/066,337, filed Nov. 21, 1997 and claims priority thereto.

BACKGROUND OF THE INVENTION

1. Field of the Invention

The present invention relates to an apparatus and method for separating and removing various components of a processing system which may adhere to one another. More particularly, the present invention provides a set of tapped holes and associated screws sized and adapted to facilitate separation and removal of the associated components.

2. Background of the Related Art

In the fabrication of integrated circuits, equipment has been developed to automate substrate processing by performing several sequences of processing steps without removing the substrate from a vacuum environment, thereby reducing transfer times and contamination of substrates. Such a system has been disclosed for example by Maydan et al., U.S. Pat. No. 4,951,601, in which a plurality of processing chambers are connected to a transfer chamber. A robot in a central transfer chamber passes substrates through slit valves in the various connected processing chambers and retrieves them after processing in the chambers is completed.

The processing steps carried out in the vacuum chambers typically require the deposition or etching of multiple metal, dielectric and semiconductor film layers on the surface of a substrate. Examples of such processes include chemical vapor deposition (CVD), physical vapor deposition (PVD), and etching processes.

It has been discovered that some processes perform better with, or even require, the heating of certain chamber components. For example, one organometallic compound of increasing interest as a material for use in ultra large scale integrated (ULSI) dynamic random access memory (DRAMS) is Barium Strontium Titanate (BST) due to its high dielectric constant. One manner of depositing BST is using a BST CVD process which entails atomizing a compound, vaporizing the atomized compound, depositing the vaporized compound on a heated substrate, and annealing the deposited film.

However, one difficulty encountered in a BST CVD process is that BST precursors have a narrow range of vaporization between decomposition at higher temperatures and condensation at lower temperatures, thereby requiring controlled temperatures from the vaporizer into the chamber and through the exhaust system. Accordingly, to prevent unwanted condensation on chamber components and to prevent decomposition, the internal surfaces of the chambers are preferably maintained at a suitable temperature above ambient (e.g., 200° to 300° C.).

Furthermore, it has been recognized that deposition layer uniformity can be enhanced and that system maintenance can be reduced, if substantially all of the system components (other than the substrate and the substrate heater) exposed to the process chemistry are substantially maintained at an ideal isothermal system temperature (e.g. 250°+/−5° C. for BST). Thus, the deposition chamber for such a process incorporates several active and passive thermal control systems.

Also, the BST deposition process may be performed at elevated substrate temperatures, preferably in the range of about 400° to about 750° C., and the annealing process may be performed at substrate temperatures in the range of about 550° to about 850° C. These high temperature requirements impose certain material property demands on the chambers used in the deposition process. For example, the elastomeric O-rings, typically used to seal the deposition chamber, are not generally made of materials that will resist temperatures in excess of about 100° C. for many fabrication cycles. Seal failure may result in loss of chamber pressure as well as contamination of the process chemistry and system components resulting in defective film formation on the wafer. Therefore, the deposition chamber also includes thermal control features which serve to protect a main chamber seal by cooling the seal below the ideal isothermal system temperature.

However, the heating and cooling of the chamber components as well as the associated temperature differentials therebetween often can cause the components which must be removed and replaced to "stick" to one another. Likewise, other conditions, such as the close tolerances used in the manufacture of the chamber components, cause or contribute to the sticking of the components. Other factors that may contribute to sticking of components include mechanical clamping that often occurs when two flat plates are bolted together. The mechanical clamping combined with elevated temperatures may cause some fusing or inter-diffusion between the components. Also, the high vacuum environment of the process chambers further contributes to the sticking problem.

When maintenance of the chamber is required, the chamber is cooled and is at least partially disassembled by separating and removing some of the components. When the components are stuck together, however, the maintenance task becomes extremely burdensome because the components are relatively sensitive to damage and cannot merely be pried apart due to the precision with which the components are manufactured. Furthermore, prying would likely damage the plating, such as nickel plating, on the surfaces. Furthermore, because the components are manufactured with such close tolerances, prying apart the components is often impractical.

In some instances, a separating arrangement between the sticking pieces may be used, such as a threaded bore through a first component and a corresponding screw to separate the first component from a surface on a second component. To separate the first component from the second component, the screw is screwed into the threaded bore on the first component, and as the screw is threaded into the bore, the removal screw pushes against the surface to force the first component to separate from the surface of the second component. However, the screw may cause cosmetic surface damage on the second component and leave particles, such as nickel particles dislodged from the nickel plated surfaces, to contaminate the process. Also, threaded bores used to separate the components may be remotely located from threaded bores used to secure the components together, but in such instances, additional screws or plugs may be required if the second component cannot be exposed to the processing conditions. The additional holes and plugs and screws add undesirable complexity to the arrangement. Additionally, if the same holes used for attaching the components are used for removal and the removal screw pushes directly against the threaded bore surface, the threads in the threaded bore may be damaged, leading to further maintenance, repair, and increased likelihood of contaminant particles.

Consequently, there is a need for an apparatus and a method for separating the components of a processing chamber from the other components of the processing system to facilitate disassembly and maintenance of the system components without causing damage to either component.

SUMMARY OF THE INVENTION

The present invention generally provides an apparatus and a method for separating components of a processing system which are mounted to one another and may adhere after being subjected to processing conditions. In one aspect, the invention provides a removal screw that can be threaded into a bore on a first component and an abutment screw that can be threaded into an attachment hole on a second component. To separate the first component from the second component, the abutment screw is first threaded into the attachment hole on the second or stationary component, and then the removal screw is threaded into the bore on the first component. As the removal screw engages the abutment screw, the removal screw pushes against the head of the abutment screw and forces the two components to separate. An important aspect of this invention is that the removal screw does not substantially contact, and therefore cause damage to, the contact surface between the first and second component to separate the components. Also, the removal screw should not substantially contact the threads in the attachment hole to deform the threads so as to be difficult to reuse the threads for reassembly.

In a preferred embodiment, the present invention provides an apparatus for separating components in a deposition processing chamber comprising a processing chamber having a first component and a second component, a removal hole at least partially threaded and disposed through the first component, a threaded attachment hole at least partially disposed through the second component, the attachment hole having an outside diameter smaller than an inside diameter of the removal hole, an attachment screw having an outside diameter smaller than the inside diameter of the removal hole and adapted to pass through the removal hole in the first component and engage the attachment hole in the second component, an abutment screw having an outside diameter smaller than the inside diameter of the removal hole and adapted to pass through the removal hole in the first component and engage the second component perhaps in the attachment hole, and a removal screw having an outside diameter greater than the outside diameter of the attachment hole and adapted to thread into the removal hole and abut the abutment screw when the abutment screw is inserted into the second component.

In another aspect, the invention provides an apparatus and a method to separate system components that can be used in existing processing systems with minor modifications. Such modifications may include utilizing existing bores in the first component by converting them into threaded removal holes without adding additional holes in both components.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENT

The present invention provides an apparatus and a method for separating and removing the components of a process system. Although the present invention is equally applicable to any process system components that are interconnected, such as a gas diffuser, i.e., faceplate, attached to a chamber lid, for ease of description, the present application will describe the invention as applied to a support ring, as the first or secured component, attached to a base of a lid, as the second component, of a process chamber. Another area where components adhere to one another is in the showerhead where a blocker and/or a faceplate adhere to one another or to the base of the lid.

Figure 1:
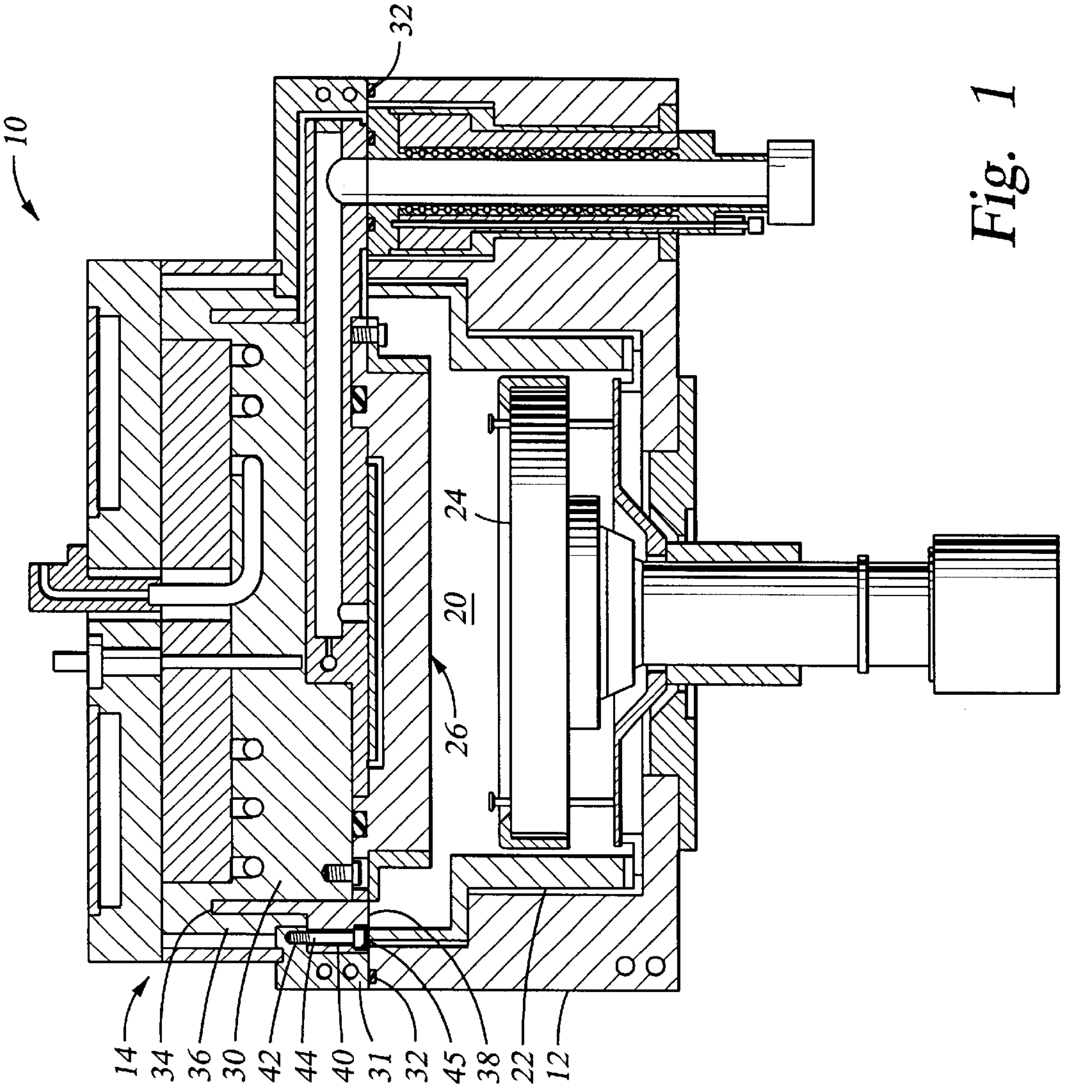
FIG. 1 is a side cross sectional view of a deposition process chamber showing the chamber body supporting a lid assembly and incorporating the present invention.

FIG. 1 is a side cross sectional view of a deposition processing chamber 10 showing the chamber body 12 supporting a lid assembly 14 and incorporating the present invention. The chamber body 12 defines an inner annular processing region 20 defined on the perimeter by an annular wall 22. A substrate support member 24 extends through the bottom of the chamber and defines the lower end of the processing region 20. A faceplate 26 mounted on an the lid defines the upper end of the processing region 20. The chamber body and lid assembly 14 are preferably made of a rigid material, such as aluminum, stainless steel or combinations thereof.

The lid assembly 14 preferably comprises a main body 30 machined or otherwise formed of a metal having a high thermal conductivity. The main lid body 30 defines an annular channel 34 formed around its perimeter to define a thin outer annular wall 36. A support ring 38, preferably made of stainless steel or other thermal insulator, is disposed in the channel to provide structural support for the lid and to prevent thermal conduction to the outer wall 36. The thin outer wall of the body member provides a thermal choke for the base 31 of the lid which is sealed to the chamber body during processing at the O-ring seal 32.

A removal hole 40 in the support ring 38 communicates with the lid by extending through the support ring to allow contact with some portion of the lid and is aligned with an attachment hole 42 extending at least partially into the base 31 of the lid. The attachment hole 42 includes threads adapted for cooperative engagement of an attachment screw 44. The removal hole 40 preferably has an inner diameter that is greater than We outer diameter of the threaded portion of the attachment screw 44 so that the attachment screw 44 passes freely through the removal hole 40 for operable engagement with the attachment hole 42. However, the outer diameter of the removal hole 40 is preferably smaller than the outer periphery of a head of the attachment screw 44, or a washer supported by the head or other similar arrangements, so that the head will not pass through the removal hole 40, but will act to secure the support ring 38 to the base 31 of the lid. In most instances, the outer periphery of the head may be a circular shape, however, other shapes could be used. Additionally, the removal hole 40 and attachment screw 44 may be used for further aligning, or "centering," of the components. To align the components and respective holes, the inner diameter of the removal hole 40 and the outer diameter of the attachment screw 44 are preferably substantially equal, but allow sufficient clearance for the attachment screw 44 to pass through the removal hole 40. Preferably, the removal hole 40 includes a counterbore portion 45 sized to receive the head of the attachment screw 44 therein providing a flush area and defining an engagement surface for abutting engagement of the head and the support ring 38. Also, preferably the lid and support ring have a plurality of removal holes and attachment holes with associated screws. Therefore, when the support ring 38 is to be secured to the base 31 of the lid, the removal holes 40 in the support ring 38 are aligned with the attachment holes 42 of the base 31 and the attachment screws 44 are passed through the removal holes 40 and are screwed into the attachment holes 42 with the heads of the attachment screws 44 abutting the counterbore portion 45 of the removal holes 40 to secure the support member 38 to the base 31.

Figure 2:
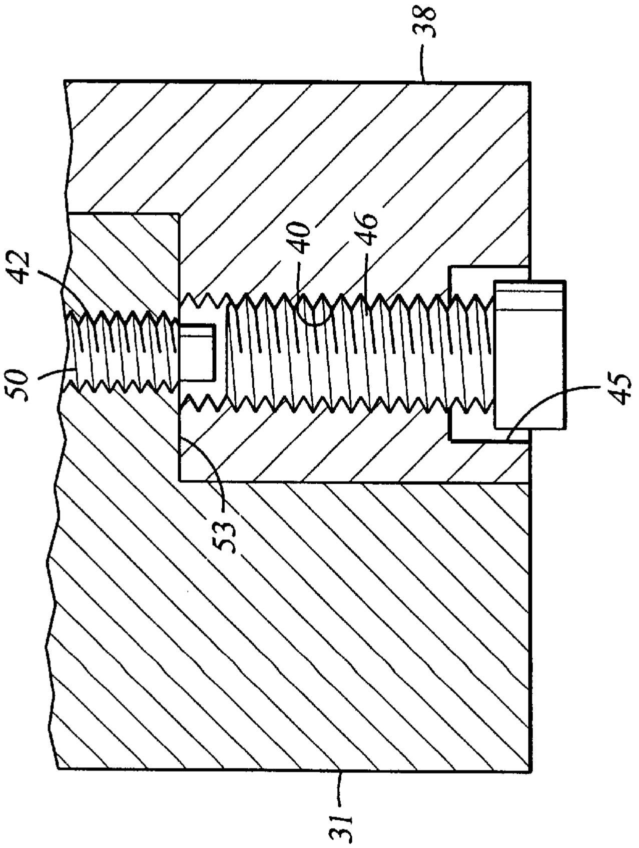
FIG. 2 is a partial cross sectional view of the removal hole with the removal screw partially threaded into the removal hole of a first component and an abutment screw recessed in an attachment hole in a second component.

FIG. 2 is a partial cross sectional view of one removal hole 40 with the removal screw 46 partially threaded into the removal hole and an abutment screw 50 recessed in the attachment hole 42. The term "abutment screw" is defined broadly herein and encompasses set screws which includes screws having an hexagonal, square, or otherwise shaped head, whether recessed or external, a slotted head screw, or other threaded members which preferably have a head no greater in dimension than the cross section of the threaded portion of that member. The abutment screw, in some embodiments, where appropriate could include a typical screw having a head larger in dimension than the threaded cross section. The abutment screw may be made from materials such as high density and/or high temperature plastics, such as Teflon®, Vespel®, PEEK®, or of various metals such as stainless steel, carbon steel, or in some instances soft metals such as aluminum or brass, or other materials. The abutment screw 50 includes a threaded portion extending some length into the attachment hole 42 with a portion, typically the head, of the abutment screw remaining unengaged with the attachment hole 42. It is important that the abutment screw 50 does not threadably engage the threaded area of the removal hole 40 and inhibit the removal of the support ring 38. Also, the removal screw is adapted to avoid substantial contact with the contact surface 53 that would damage the surface as discussed above. The removal screw is also adapted to avoid substantial contact with the threads in the attachment hole, in this instance, with cooperation of the abutment screw. In any of the embodiments, the removal screw may include a plug or cap, described in more detail in FIGS. 6 and 7 below, that may assist in lessening d to the abutment surface, such as the abutment screw.

The removal screw 46 is threaded and is adapted to cooperatively mate with the threads of the removal hole 40. The removal screw preferably has a larger diameter than the attachment screw, so the threads in the removal screw 46, and not the attachment screw 44 referenced in FIG. 1, will engage the removal hole 40. Preferably, the removal hole 40 has an inner diameter that is slightly larger than the outer diameter of the attachment hole 42, so that the abutment screw may be inserted through the removal hole 40 and into the attachment hole 42. The removal screw 46 preferably has an outer diameter that is slightly larger than the inner diameter of the attachment hole 42. This slight difference in diameter allows the components to be mounted to one another while also maintaining a centering or aligning function despite the difference in the sizes of the respective bores.

Alternatively, the removal hole 40 may be the same size as the attachment hole 42, for instance, if the abutment screw 50 includes a head smaller in diameter than the threaded portion of the abutment screw, and extends into the removal hole 40 when the abutment screw is recessed therein. In some embodiments of the invention, the removal holes could be substantially equal in diameter with the attachment hole if the abutment screw was for instance positioned longitudinally in the Attachment hole so that it only engaged the threads in the attachment hole 42. This arrangement could be effected by a short counterbore (not shown) in the attachment hole 42. In such instance, the removal screw 46 would be positioned so that at the point of contact with the abutment screw, the removal screw did not engage the attachment hole threads.

Figure 8:
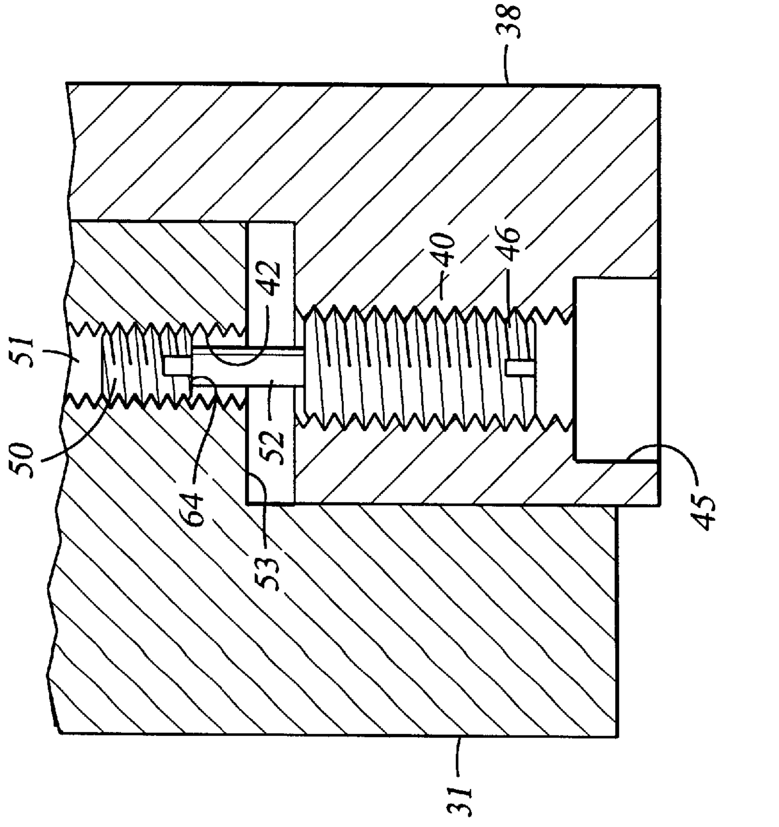
FIG. 8 is an alternative embodiment having a shank on the removal screw and an abutment screw recessed in the attachment hole.

The threaded length of the removal screw 46 is preferably long enough to provide a threaded surface area to break the bond between the two components during disassembly. Practically, it might extend outside of the first component for ease of turning. If the removal screw was itself a set screw, the length could be less, as long as it was long enough to engage sufficient threads in the removal hole 40 to effect the disassembly and separation of the two components. An example is shown in FIG. 8, below.

In operation, the components are secured together by the attachment screw 44 using the attachment hole 42. To separate the components, the attachment screw is removed, and the abutment screw 50 is inserted through the removal hole 40 and threaded into the attachment hole 42 for some length. Then the removal screw 46 is inserted into the removal hole 40 and abuts the head of the abutment screw 50. Additional turning of the removal screw 46 exerts a force against the abutment screw 50, pushing the support ring 38 away from the base 31. Several holes could be appropriately spaced in a variety of locations such as might further enhance the even separation of tightly fitting components.

By using the different diameters of the holes and screws and/or sequence described, the invention differs from prior efforts and causes a separation of the components that results in less, if any, damage to the respective components. Accordingly, by screwing the removal screw 46 into the removal hole 40, the components may be separated from one another and disassembled without compromising the integrity of either component.

Figure 3:
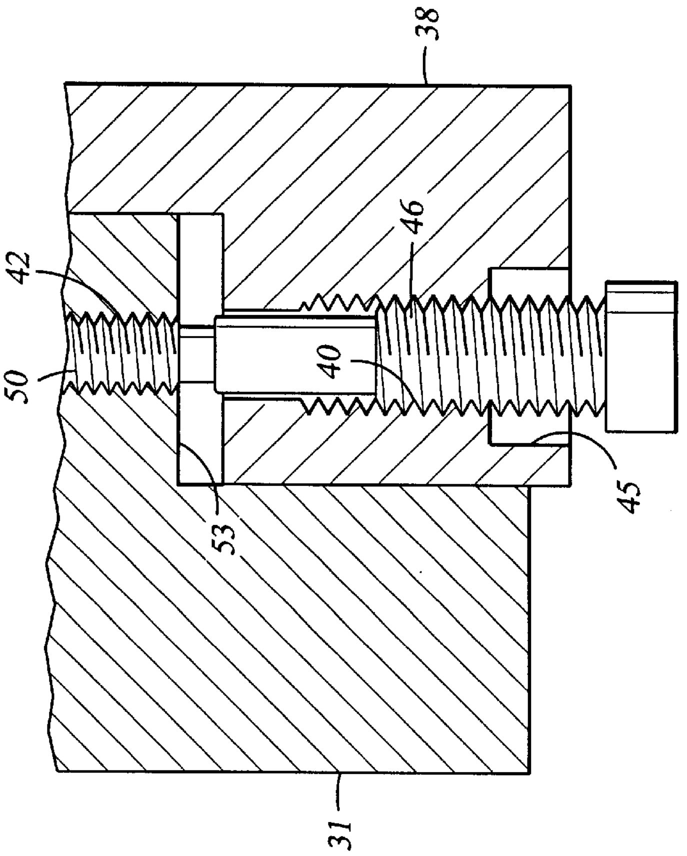
FIG. 3 is a partial side cross sectional view of an alternative embodiment showing a partially threaded removal hole having a removal screw threaded therein, showing the first and second components partially separated.

FIG. 3 is a partial cross sectional view of an alternative embodiment, having a removal hole 40 with a removal screw 46 threaded therein. The components are shown partially separated, as would be the case using the embodiment of FIG. 2. As shown in FIG. 3, the threads of the removal hole 40 and/or removal screw 46 may not extend the full length of the removal hole 40. An unthreaded portion may be useful for difficult machining material, such as stainless steel, where a fully removal hole may be difficult to thread. However, the threaded portion should be long enough to assure sufficient engagement strength to be able to separate the two components with the removal screw.

Similar to the previous described embodiment, the partially threaded removal hole 40 has an inner diameter throughout its length that is preferably only slightly larger than the outer diameter of the attachment screw 44 to maintain an alignment of the components during assembly. In the alternative design, the removal screw 46 may have a corresponding unthreaded portion. Also, centering of the attachment screw can be done by providing an unthreaded portion in the removal hole and dimensioning the unthreaded portion in close tolerance to the unthreaded portion of the removal screw 46. Additionally, the unthreaded portion(s) may be tapered to aid in the alignment.

In instances where the material of the component is a soft material such as aluminum, inserts may be disposed in the hole(s) to provide the threaded portion. One such commercially available insert is known as a Helicoil. The need for an insert and the dimensions of the threads in the various holes depends on such factors as the strength of the materials used, the degree of adherence, i.e., bonding strength between the components, and the length of the threads in relation to the diameter of the threads. The respective hole(s) may be sized to accommodate the insert(s) so that the final outside diameter of the attachment hole 42 is no greater in cross section than the final inside diameter of the removal hole 40. Either the attachment hole or the removal hole or both may have an insert disposed therein to enable threaded engagement.

Figure 4:
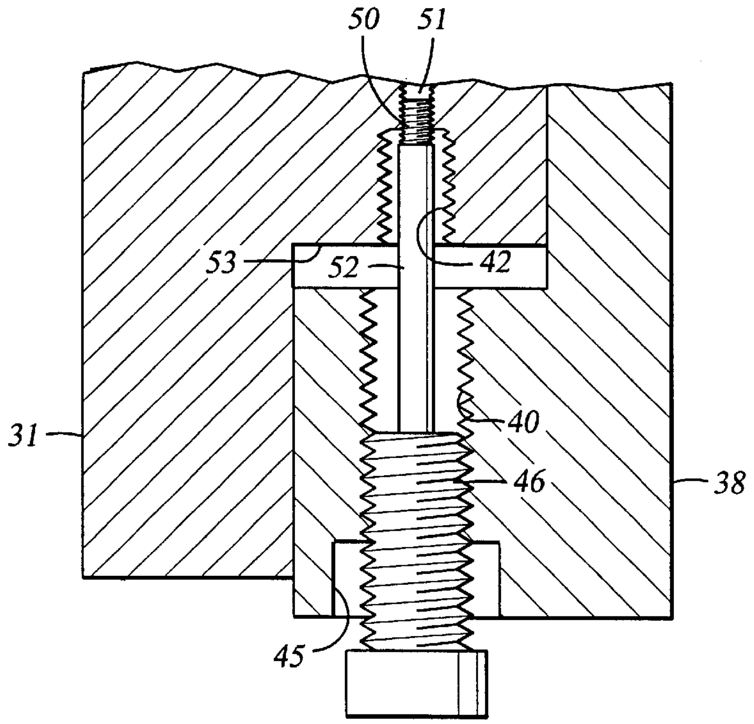
FIG. 4 is an alternative embodiment having a shank on the removal screw and a recessed hole in the attachment hole.

FIG. 4 shows another embodiment of the present invention, where the abutment screw 50 is inserted into a recessed hole 51 and the removal screw 46 has a shank 52 that abuts the abutment screw, without damaging the threads of the attachment hole 42. In this embodiment, preferably, the outer diameter of the recessed hole 51 is smaller than the inner diameter of the attachment hole 42. The outside diameter of the shank is preferably smaller than the inside diameter of the attachment hole. An important aspect of this invention and this embodiment is that the removal screw does not contact, and damage, the contact surface 53 between the first and second component to separate the components. Thus, contact between the shank 52 and the abutment screw 50 to separate the components avoids unwanted contact between the removal screw 46 and the contact surface 53, as well as avoids unwanted contact between the removal screw and the threads of the attachment hole.

Figure 5:
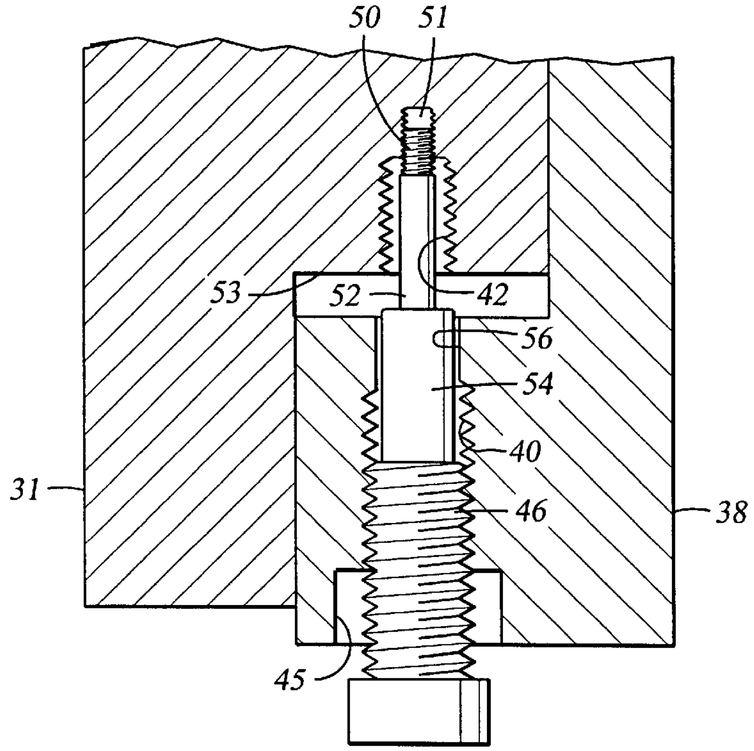
FIG. 5 is a variation of FIG. 4 having an unthreaded portion on either the removal screw, removal hole, or both.

FIG. 5 is a variation of FIG. 4 in which an unthreaded portion 54 on the removal screw 46 aligns with an unthreaded portion 56 on the removal hole. In FIG. 4, centering of the components relied on the inner diameter of the removal hole threads and the threads of the attachment hole. In this embodiment, centering may be enhanced by the cooperative fit between the two unthreaded portions. In some instances, it might be desirous to have only one unthreaded portion on either the removal screw or the removal hole.

Figure 6:
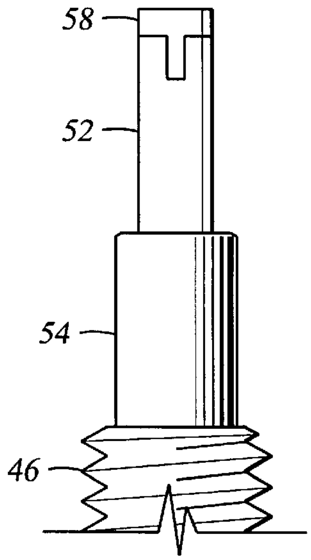
FIG. 6 is a detail cross section of the removal screw having a shank with a non damaging plug.

FIG. 6 shows a detail of one embodiment of the removal screw, here the end of the shank 52. To further avoid damage to the attachment hole and/or abutment screw, the removal screw could be fitted with a plug 58, made of a high density and/or high temperature plastic, such as Teflon®, Vespel®, PEEK®, preferably where the material would generally produce minimal, if any, contaminant particulates from wear and have a low coefficient of friction. The plug may also be made of soft metals, such as brass or aluminum. The plug shape may be rounded, flat, or coned, or other appropriate shapes. The plug could be replaceable as the need occurs. The plug may be pressed fitted, threaded, or adhesively attached to the removal screw. An appropriate adhesive would be a high vacuum compatible and perhaps a high temperature adhesive, such as an epoxy.

Figure 7:
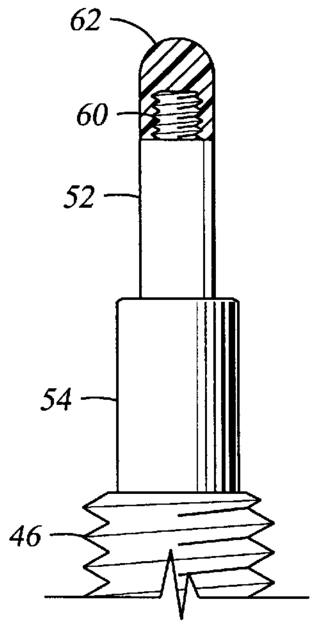
FIG. 7 is a detail cross section of the removal screw having a shank with a non damaging cap.

FIG. 7 shows a variation of FIG. 6 having a cap 60 which may be threaded onto the end of the removal screw and, in this instance, onto the shank 52 having an end threaded portion 62. Similar to the plug in FIG. 6, the cap may be made of similar materials, have similar shapes, and be similarly attached using a threaded engagement, a pressed fit, or an adhesive. The plug and cap may also be used on the other embodiments of the removal screw as well. In some embodiments, it may be preferable to include a plug or cap on the removal screw and utilize a plastic or soft metal abutment screw, depending on the force required to separate the particular components in question, to lessen the risk of damage to the respective surfaces.

FIG. 8 shows another variation of the present invention. The shank 52 allows an alternative design where the abutment screw 50 engages the attachment hole threads, as was described in FIGS. 2 and 3. If the attachment hole is long enough to recess the head 64 of the abutment screw sufficiently in the attachment hole and still provide sufficient engagement threads for the attachment screw during assembly, then the abutment screw could remain in the attachment hole. During disassembly, the attachment screw could be removed, and the removal screw with the shank 52 inserted to abut the abutment screw without engaging or damaging the attachment hole threads. Also, the removal screw 46 is shown as a set screw, described above as an alternative embodiment of the removal screw.

Figure 9:
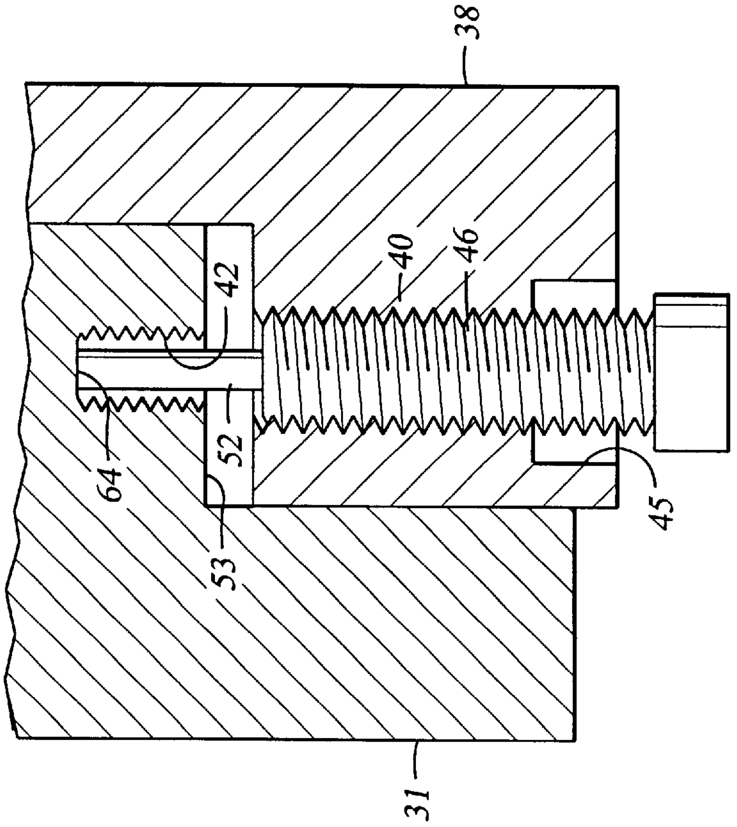
FIG. 9 is an alternative embodiment having a shank on the removal screw that abuts the bottom of the attachment hole.

FIG. 9 shows yet another variation using the concept of the shank 52, similar to FIG. 8. With the shank 52 avoiding substantial contact with the contact surface 53 and the threads of the attachment hole 42, the end of the shank can abut the bottom 66 of the attachment hole. By continuing to rotate inward the removal screw, the components can be separated as described above. An important feature of this embodiment, similar to the other embodiments, is that damaging contact between the removal screw and the contact surface is avoided as well as damaging contact between the removal screw and the threads in the attachment hole. In this embodiment, as in other embodiments, a plug or cap could be used.

Although the above description describes a device using an abutment screw and a removal screw, the present invention can also be practiced alternatively with a removal hole on a first component and a corresponding removal screw to push against a surface of the second component. Additionally, the above embodiments discuss the typical arrangement of a closed or “blind” attachment hole 42, where the abutment screw could be inserted only from the removal hole side. If an opposing end of the second component were open, then the abutment screw, such as a set screw or a typical screw, having a head larger than its threaded cross-section, could be inserted from the opposite side and protrude through the second component into the removal hole 40. A removal screw 46 could then abut the end of the abutment screw that is threaded through the second component to separate the components in like fashion as described above.

While foregoing is directed to the preferred embodiment of the present invention, other and firer embodiments of the invention may be devised without departing from the basis scope thereof, and the scope thereof is determined by the claims that follow.

What is claimed is:

1. An apparatus for separating components in a substrate processing chamber, comprising:

a chamber lid;

an abutment screw at least partially threaded into the chamber lid;

a processing chamber component comprising at least one removal hole extending through the processing system component and at least partially communicating with the abutment screw on the chamber lid, wherein at least a portion of the removal hole is threaded;

a removal screw adapted to thread into the removal hole and abut the abutment screw, wherein the removal screw engages the abutment screw to separate the processing chamber component and the chamber lid; and at least one threaded attachment hole extending at least partially into the chamber lid and positioned for alignment with the removal hole.

2. The apparatus of claim 1, wherein the removal screw is adapted to avoid substantial contact with the chamber lid.

3. The apparatus of claim 1, wherein the removal screw is adapted to avoid substantial contact with threads in the attachment hole in the chamber lid.

4. The apparatus of claim 2, wherein the abutment screw is adapted to pass through the removal hole in the processing chamber component and engage the chamber lid.

5. The apparatus of claim 1, wherein only a portion of the removal hole and the removal screw are threaded.

6. The apparatus of claim 1, further comprising a plurality of removal holes spaced about the processing system component in alignment with a plurality of attachment holes disposed in the chamber lid.

7. The apparatus of claim 1, wherein the removal hole and the removal screw comprise a tapered portion.

8. The apparatus of claim 1, further comprising a threaded insert at least partially disposed in the removal hole.

9. The apparatus of claim 3, wherein the removal screw comprises a threaded portion and an unthreaded portion, the unthreaded portion having a smaller diameter than the threaded portion.

10. The apparatus of claim 1, wherein the removal screw comprises a plug or cap.

11. An apparatus for separating components in a processing chamber comprising:

a processing chamber having a first component and a second component;

a removal hole at least partially threaded and disposed through the first component;

a threaded attachment hole at least partially disposed through the second component, the attachment hole having a maximum diameter smaller than a minimum diameter of the removal hole;

an attachment screw adapted to pass through the removal hole in the first component and engage the attachment hole in the second component;

an abutment screw adapted to pass through the removal hole in the first component and engage the second component; and a removal screw adapted to thread into the removal hole and abut the abutment screw on an abutting surface when the abutment screw is inserted into the second component, wherein the removal screw engages the abutment screw to separate the first component and the second component.

12. The apparatus of claim 11, wherein the attachment screw and the abutment screw have an outside diameter smaller than the inside diameter of the removal hole and the removal screw has an outside diameter greater than the outside diameter of the attachment hole.

13. The apparatus of claim 11, further comprising a plurality of removal holes and attachment holes spaced about the first component in abutment with the second component.

14. The apparatus of claim 11, wherein only a portion of the removal hole and the removal screw are threaded.

15. The apparatus of claim 11, further comprising a threaded insert at least partially disposed in the removal hole.

16. An apparatus for separating components, comprising:

a first component;

a second component comprising at least one removal hole extending through the second component and at least partially communicating with the first component, and wherein at least a portion of the removal hole is threaded;

a removal screw adapted to avoid substantial contact with the second component; and an abutment screw at least partially threaded into a hole in the first component having an outer diameter that is less than the inner diameter of the removal hole and adapted to pass therethrough to be threaded into a threaded hole in the second component, wherein the removal screw engages the abutment screw to separate the first component and the second component.

17. The apparatus of claim 1, wherein the processing chamber component is selected from the group of a gas diffuser, a support ring, or a blocker.

* * * * *

UNITED STATES PATENT AND TRADEMARK OFFICE

CERTIFICATE OF CORRECTION

PATENT NO. : 6,298,534 B1
DATED : October 9, 2001
INVENTOR(S) : Sajoto

It is certified that error appears in the above-identified patent and that said Letters Patent is hereby corrected as shown below:

Title page,
Heading, please replace "Sajota" with -- Sajoto --.
Title and Column 1, please delete ", APPARATUS AND METHOD".
Inventor's name, please replace "Sajota" with -- Sajoto --.
ABSTRACT, line 1, please delete "and a method".

Drawings,
Figure 9, please replace "64" with -- 66 --.

Column 1,
Line 62, please replace "e.g." with -- e.g., --.

Column 4,
Line 49, please delete "an".

Column 5,
Line 5, please replace "We" with -- the --.

Column 6,
Line 2, please replace "d" with -- damage --.
Line 28, please replace "Attachment" with -- attachment --.

Column 9,
Line 5, please replace "firer" with -- further --.

Signed and Sealed this

Ninth Day of April, 2002

*Attest:*

JAMES E. ROGAN
*Director of the United States Patent and Trademark Office*

*Attesting Officer*